United States Patent [19]

DiSanto et al.

[11] Patent Number: 4,889,603

[45] Date of Patent: Dec. 26, 1989

[54] METHOD OF ELIMINATING GAS BUBBLES IN AN ELECTROPHORETIC DISPLAY

[75] Inventors: Frank J. DiSanto, North Hills; Denis A. Krusos, Lloyd Harbor; Frederic E. Schubert, Shorehan, all of N.Y.

[73] Assignee: Copytele, Inc., Huntington Station, N.Y.

[21] Appl. No.: 281,701

[22] Filed: Dec. 9, 1988

[51] Int. Cl.$^4$ ............................ G09G 3/34; G02F 1/00
[52] U.S. Cl. ............................ 204/180.1; 204/299 R; 340/787
[58] Field of Search ............... 204/300 EL, 300 PE, 204/299 R, 299 PE, 299 EC, 180.1; 340/787

[56] References Cited

U.S. PATENT DOCUMENTS 3,668,106  6/1972  Ota .......................... 204/299 PE
3,674,475  7/1972  Silverberg .................. 204/299 PE
4,285,801  8/1981  Chiang ....................... 204/299 R
4,298,448  11/1981 Müller et al. ................ 204/180.1 X Primary Examiner—John F. Niebling
Assistant Examiner—John S. Starsiak, Jr.
Attorney, Agent, or Firm—Arthur L. Plevy

[57]  ABSTRACT

There is disclosed a method which minimizes bubble growth during electrophoretic cell operation. The method involves exposing the electrophoretic suspension to an ultrasonic probe at a given frequency and amplitude and for a suitable time period just prior to pouring the suspension into the electrophoretic display. Exposure to the ultrasonic probe minimizes bubble growth during actual cell operation as the probe operates to drive out a significant amount of gas contained in the suspension while further affecting the pigment particle characteristics.

10 Claims, 1 Drawing Sheet

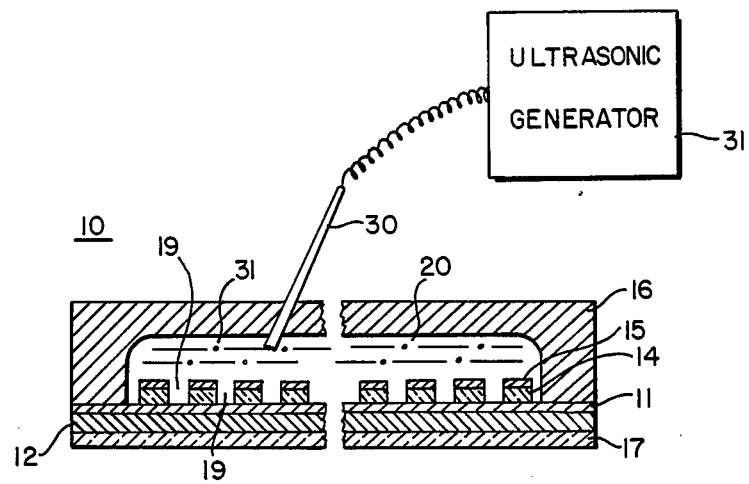

METHOD OF ELIMINATING GAS BUBBLES IN AN ELECTROPHORETIC DISPLAY

BACKGROUND OF THE INVENTION

This invention relates to electrophoretic display panels in general and more particularly to a method of eliminating gas bubbles during operation of such an electrophoretic display.

The electrophoretic effect is well known and the prior art is replete with a number of patents and articles which describe the effect. It is sufficient to state that researchers have been working with the electrophoretic effect for many years. Essentially, the electrophoretic effect operates on the principle that certain pigment particles will become electrically charged and because of being electrically charged these particles can migrate from a like charged surface to an opposite charged surface.

Many of the prior art references describe various particle materials which when suspended in solution exhibit the electrophoretic effect. The effect is associated with a working fluid or solution as a dispersion including pigment particles. These particles may be fabricated from opaque dielectric materials such as Titania and other pigments which particles are suspended in a colored non-conducting suspension medium to form a dispersion. The particles are distributed uniformly throughout the suspension medium with the suspension medium being of a contrasting color to the particle color. When the composite material is subjected to an electric field the particles are caused to move electrophoretically in the direction of either the cathode or anode. These particles are deposited upon a respective structure to cause that structure to assume the color of the particle. Hence, as one can see, by selectively moving the particles one can produce images based on the migration and orientation of the particles with respect to a charged surface. The effect is well known and used for displays.

See for example U.S. Pat. No. 4,732,840 issued on Mar. 27, 1988 to DiSanto et al. and entitled "Electrophoretic Display Panels and Associated Methods" and assigned to Copytele, Inc., the assignee herein. This patent basically describes the structure of an electrophoretic display including the components of the display. Also see U.S. Pat. No. 4,742,345 issued on May 3, 1988 to DiSanto et al. and entitled "Electrophoretic Display Panel Apparatus and Methods Therefor" and assigned to the assignee herein. Also see U.S. Pat. No. 4,746,917 issued on May 24, 1988 to DiSanto et al. and entitled "Method and Apparatus for Operating an Electrophoretic Display Between a Display and a Non-Display Mode". Also see U.S. Pat. No. 4,772,820 issued on Sept. 20, 1988 to DiSanto et al. and entitled "Monolithic Flat Panel Display Apparatus" and assigned to the assignee herein.

It has been discovered that when such electrophoretic displays are operated gas bubbles which are inherently present in the dispersion due to the fabrication processes tend to gather together and grow in size. This bubble growth causes voids in the display and the bubbles as formed can actually be seen. The bubbles, when the display is originally produced, are extremely small in size and as the display is operated, by placing suitable biasing potentials on the display electrodes, the bubble size grows. This is further enhanced due to the turbulence created by the transported pigment particles as they do not move in a linear manner or with constant velocity. These rather large bubbles create flaws in the viewing surface of the display and oftentimes can render the display unusable.

It is believed that the cause of the bubbles are due to gases such as dissolved air which is always present when the dispersion is interposed between the suitable display electrodes. The particle suspension fluids are non polar and hence they tend to absorb more air. It is desirable to avoid any bubbles of gas during the filling and sealing of the cell or display and to maintain the number of bubbles as small as possible. In any event, as indicated above, the dispersions contain solvents with dissolved gases and high surface area pigment particles with absorbed gases. These all tend to generate bubbles of gas when the cell operates. As operation of the cell increases the bubble size increases whereby the small minute bubbles join together to form layer bubbles which, as indicated above, serve to render portions of the viewing surface of the display unusable.

For examples of suitable fluids which operate in electrophoretic displays, reference is also made to U.S. Pat. No. 4,093,534 which issued on June 6, 1978 and entitled "Working Fluids for Electrophoretic Image Display Devices" by C. F. Carter et al. This patent provides a working fluid which includes a dispersion of finely divided particles of an opaque dielectric material suspended in a suspension medium. The particles are transportable within a suspension medium under the influence of an electric field. This patent describes various structures which produce a display operating according to the electrophoretic phenomenon.

U.S. Pat. No. 4,285,801 entitled "Electrophoretic Display Composition" issued on Aug. 25, 1981 to A. Chiang and describes a suspension for an electrophoretic display where the particles are coated with a highly fluorinated polymeric material which acts as the dispersant. Essentially, as indicated, the particles are chosen to optically contrast with the medium. Accordingly, the optical contrast may result from using light reflecting versus light absorbing materials or materials of different colors as above indicated.

See also U.S. Pat. No. 4,272,596 issued on June 9, 1981 to J. R. Harbour et al. entitled "Electrophoretic Display Device" and assigned to the Xerox Corporation. This patent describes an electrophoretic display which provides high contrast images in a stable suspending fluid. See also U.S. Pat. No. 4,077,936 entitled "Liquid Suspending Medium for Electrophoretic Image Display/and or Recording Device" issued on May 7, 1978 to S. Tanaka et al. and assigned to Matsushita Electric Industrial Co. This patent describes a liquid suspending medium for an electrophoretic image display which contains an oligomer of 1,1,2-trifluoro-2-chloroethylene. The use of this oligomer purportedly facilitates gravity adjustment between a liquid suspending medium and electrophoretic particles and results in a liquid suspending medium suitable for an electrophoretic image display.

As one can understand, the solvents employed in such displays are associated with dissolved gases which dissolved gases are mainly air and tend to accumulate to produce large bubbles during display operation while particle motion also causes bubble formation. The larger bubbles interfere with the visual aspects of the display. It is immediately noted that in any of the above devices or displays such bubble generation occurs during prolonged display or cell operation.

It is therefore an object of the present invention to provide a method for eliminating gas bubbles in an electrophoretic display.

It is a further object of the present invention to utilize an ultrasonic probe which is placed into the dispersion medium to cause bubbles to rapidly be removed from the display without damaging the dispersion.

It is therefore another object of the present invention to provide an improved electrophoretic display having minimum bubble generation during operation.

SUMMARY OF THE INVENTION

A method of eliminating gas bubble formation in an electrophoretic display of the type containing an electrophoretic dispersion including pigment particles suspended in a suitable solution, comprising the step of agitating said dispersion at a given frequency rate to cause captured gas bubbles to migrate from said dispersion into the surrounding air prior to placing said dispersion into said display.

BRIEF DESCRIPTION OF THE FIGURES

The sole FIGURE is a cross-sectional view of a typical electrophoretic display illustrating the method employed to eliminate gas bubbles.

DETAILED DESCRIPTION OF INVENTION

Referring to FIG. 1, there is shown an electrophoretic display device 10 according to this invention. As will be explained, the electrophoretic display consists of a plurality of cathode lines 11 which lines are arranged in a horizontal or vertical direction but for purposes of explanation it is assumed that the cathode lines are arranged in a horizontal direction. The cathode lines are essentially formed in a horizontal grid pattern where the pattern contains a plurality of spaced lines each one of a given width and spaced from the other to form a horizontal grid array of conductive lines.

As seen in the FIGURE, a plate of glass 17 is coated with an extremely thin layer of indium-tin-oxide (ITO). There are many suppliers who will furnish glass sheets coated with ITO. The layer of ITO as indicated is relatively thin being approximately 300 angstroms in thickness. This layer of ITO, based on its thickness, is relatively transparent. The horizontal cathode line pattern is etched on the surface of the ITO layer 12 to form a horizontal grid pattern. Etching of the ITO layer 12 is performed using conventional etchants as used in the integrated circuit art.

Disposed upon the cathode line pattern 11 is a series of insulator members 14. The insulator members 14 are formed by a photoresist such as the phenolic resin impregnated with a photoactive material, which layer is deposited over the cathode line structure. It is immediately noted that there are many other methods for producing the above-described structure and reference is made to the patents cited in the Background of Invention.

There are a plurality of grid lines which are perpendicular to the cathode lines. Each grid line 15 is positioned above an associated cathode line and insulated therefrom at the area of intersection by a photoresist layer 14. The anode structure 16, which may be formed of ITO, is then secured to the structure to form an internal hollow 20 which hollow accommodates the electrophoretic dispersion 31.

As one will readily understand, the display is capable of being energized by applying a bias to a cathode line and a grid line to cause pigment particles to migrate from the grid cathode structure to the anode or plate structure 16.

As seen in the FIGURE, there are spaced between each grid and cathode line which form a plurality of depressions or wells 19. These wells accommodate the electrophoretic dispersion and when a bias potential is applied between the grid and cathode the pigment particles contained in the dispersion migrate from the grid cathode structure towards the anode where they are deposited and remain upon the anode to thus create an image on both the cathode and the anode.

As is clear from the FIGURE, the structure has an internal hollow cavity 20 between the anode and grid which is completely enclosed and which cavity contains the electrophoretic suspension 31. During the fabrication of the display the electrophoretic solution 31 is inserted into the internal cavity 20. Essentially, electrophoretic solution 31 consists of submicron particles of a suitable pigment suspended in a fluid vehicle. Each of these particles are encapsulated by means of a charge control and wetting agent which essentially coats the particle to enable the particle to retain an electrical charge. The particles are suspended in a suitable vehicle whose function is to wet the particles and to allow the particles to be suspended in the vehicle. The vehicle for the electrophoretic material is basically a surfactant which contains no water.

To produce an operational display, yellow pigments, designated as AAOT yellow, which is a pigment manufactured by Sun Chemical Company, can be employed. The charge vehicle employed with this pigment is sold under the designation OLOA 1200. OLOA 1200 is a charge control and wetting agent sold by EXXON Corp. To this is added tetrachloroethylene which is the vehicle solvent plus a small amount of an aromatic hydrocarbon to obtain further wetability. A typical suspension may contain, by percentage, 1% of AAOT yellow, 0.3% of the OLOA 1200, 85% of tetrachloroethylene and 13.7% of secondary butyl benzene sold and distributed by the Kodak Corporation.

In regard to the above, the dispersion including the yellow dye particles when mixed appears as a dark grey fluid and when charge is impressed the yellow pigment particles accelerate from the cathode to the anode and coat the anode giving a yellow graphic image upon a black or dark grey background. This provides for a very efficient display with clear visibility. The pigment is treated so that the particles are within the submicron range. By matching the solvent density to the pigment density, the pigment particles can remain suspended in the solvent indefinitely and the particles will not sink by means of gravity.

It is of course understood that any other suitable pigment particles can be employed such as titanium oxide (white), carbon black and so on. A suitable example of a titanium oxide is distributed by the duPont company under the grademark R-101. In regard to such a dispersion, 10% of titanium oxide is blended with 0.25% of CENTROLEX P with 8% of copper oleate of 4% concentration which is blended with tetrachloroethylene at 81.75% concentration. CENTROLEX P is a charge control and wetting agent which contains lecithin. All of the above are given by ways of examples and reference is made again to the cited patents for different examples of both solutions and pigments.

In any event, as one can understand, the dispersion contains solvents where a primary solvent for the dispersion is tetrachloroethylene. One may employ as a secondary solvent butyl benzene to help in density matching. No matter what the dispersion is, the organic molecules contained in the dispersion being non polar serve to dissolve more air. The main gases dissolved within the mixture is air. The amount of the dissolved air in the liquid is further a function of temperature. As the temperature is raised the gases would boil off, as is well known. In any event, heating such a dispersion, including the submicron particles, will severely damage the display and render the display completely inoperational.

As is known, air dissolves in liquids. At any temperature and pressure each gas in air has a particular solubility in a solvent. The main non-polar constituents of air, $N_2$ and $O_2$, should be significantly soluble in the near non-polar solvent system. Also, air collects in small interstices on the irregular surface of pigment particles. Both these factors contribute to the presence of air in the noted suspensions.

In addition, air tends to get trapped in the irregular, large surface area of layer 14 in FIG. 1. The walls of layer 14 are formed by plasma etching giving them fine irregular structure. The total running length of layer 14 in all the structure in a typical electrophoretic cell from the assignee is over one-fourth of a mile. Unless and until the walls of layer 14 are completely wetted, a significant volume of air will be trapped in the cell hollow.

Any trapped air on the pigment or in the cell, tends to coalesce into large bubbles which leave the hollow under the influence of the ultrasonic probe.

While the ultrasonic probe cannot change the equilibrium concentration of gases under a particular set of conditions, it can insure that any excess gas dissolves in the solvent will be removed. Further, the slight heating concomitantly arising with the fluid's agitation will push the gas solubility somewhat below its equilibrium, room temperature value.

As seen in the FIGURE, an ultrasonic probe 30 is inserted into the hollow 20 containing the dispersion 31. The ultrasonic probe 30 is coupled to an ultrasonic generator 31. Thus the entire suspension, when exposed to the ultrasonic probe 30 for approximately between 1–1.5 minutes and just prior to filling or pouring the suspension into the hollow 20 bubble growth is minimized. The ultrasonic probe 30 operates to drive out a significant amount of gas which otherwise is contained in the suspension. The ultrasonic probe is believed to initially promote rapid bubble growth and gases are forced out of the solution while further affecting the electrophoretic particle as to uniformity of the charged surface. An example of a suitable probe is manufactured by the Sonicor Corporation of Long Island, N.Y. Essentially the probe is a 1,000 watt probe operating at about 40 kHz. While it is understood that ultrasonics have been employed for the degasification of liquids, it has not been known why the bubbles gather together during electrophoretic display operation and which bubbles merge together to form larger bubbles capable of interfering with display operation. It is further indicated that bubble formation continues as the particles are transported between the display electrodes and that even the degasification of the liquid suspension still does not solve the bubble problem. However, by the use of a 1000 watt ultrasonic probe at 4 kHz for 1–2 minutes before pouring the suspension into the display eliminate the bubble formation during prolonged display operation. This phenomenon is not understood but it is believed that the intense ultrasonic radiation agitates the suspension including the pigment particles to cause a more uniform charge control and hence substantially reduce turbidity of particle motion, thus rendering bubble formation during display operation less likely. While injecting the probe into the display is a means of removing bubbles, it is preferred that an unsealed display be placed in a large fluid filled tank or an ultrasonic bath. The cell is filled with fluid and immersed in the bath. A probe is placed in the tank and the cell is removed after the bubbles cease. Another method is to place the fluid including the pigment particles in a beaker. Then an ultrasonic probe is inserted into the beaker to remove the gases and then the treated fluid is poured into the cell. The insertion of the probe in the cell is not the preferred technique but would suffice as well. Again it is emphasized that ultrasonic degasification of liquids is known, but the above method substantially eliminates large bubble formation during operation and is believed to be due to both the power and frequency of the ultrasonic probe and generator as well as the duration of the immersion time. If the duration is longer than a couple of minutes the probe causes localized heating and damages the dispersion.

In any event, it is understood that one cannot remove the bubbles by heating as heating would destroy the dispersion. If the bubbles are allowed to remain in the display bubble growth can render the display totally useless. It has been found that by subjecting the dispersion to an ultrasonic probe for a suitable amount of time as indicated and just prior to filling the electrophoretic display one substantially eliminates bubble growth during display operation.

What is claimed is:

1. A method of eliminating gas bubble formation in an electrophoretic display of the type containing an electrophoretic dispersion including pigment particles suspended in a suitable solution, comprising the step of:
   agitating said dispersion at a given frequency rate to cause captured gas bubbles to migrate from said dispersion prior to placing said dispersion into said display said given frequency rate being at a frequency of 40 KHZ with a 1000 Watt ultrasonic probe and for a duration between 1–1.5 minutes.

2. The method according to claim 1 wherein said solution contains tetrachloroethylene.

3. The method according to claim 1 wherein said solvent contains butyl benzene.

4. The method according to claim 1 wherein said pigment particles are submicron particles of a pigment selected from one having a yellow, white or black coloration.

5. The method according to claim 1 wherein said gas bubbles are mainly air bubbles.

6. The method according to claim 1 wherein said pigment particles are coated with a charge control and wetting agent.

7. The method according to claim 2 wherein said solution contains at least 80% concentration of tetrachloroethylene.

8. The method according to claim 7 wherein said solution contains between 1–10% pigment particles.

9. The method according to claim 8 wherein said solution contains about 10% of titanium dioxide pigment.

10. The method according to claim 8 wherein said solution contains about 4% of a yellow colored pigment.

* * * * *